(12) United States Patent
Nie

(10) Patent No.: US 10,536,393 B2
(45) Date of Patent: Jan. 14, 2020

(54) MAIL OBTAINING METHOD, TERMINAL, AND SYSTEM

(71) Applicant: Huawei Technologies Co., Ltd., Shenzhen (CN)

(72) Inventor: Chengjiao Nie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 166 days.

(21) Appl. No.: 15/598,996

(22) Filed: May 18, 2017

(65) Prior Publication Data

US 2017/0257323 A1 Sep. 7, 2017

Related U.S. Application Data

(63) Continuation of application No. PCT/CN2015/083591, filed on Jul. 8, 2015.

(30) Foreign Application Priority Data

Dec. 9, 2014 (CN) .......................... 2014 1 0749190

(51) Int. Cl.
H04L 12/911 (2013.01)
H04W 28/16 (2009.01)
(Continued)

(52) U.S. Cl.
CPC ............... H04L 47/74 (2013.01); H04L 51/10 (2013.01); H04L 51/26 (2013.01); H04L 67/06 (2013.01);
(Continued)

(58) Field of Classification Search
CPC ....... H04L 51/24; H04L 51/063; H04L 51/38; G06Q 10/107
(Continued)

(56) References Cited

U.S. PATENT DOCUMENTS 6,965,948 B1 11/2005 Eneborg et al.
2006/0168044 A1* 7/2006 Chen .................... G06Q 10/107
709/206
(Continued)

FOREIGN PATENT DOCUMENTS

CN 101127784 A 2/2008
CN 101272354 A 9/2008
(Continued)

OTHER PUBLICATIONS

Foreign Communication From a Counterpart Application, PCT Application No. PCT/CN2015/083591, English Translation of International Search Report dated Oct. 10, 2015, 2 pages.
(Continued)

Primary Examiner — Kyung H Shin
(74) Attorney, Agent, or Firm — Conley Rose, P.C.

(57) ABSTRACT

A method resolves a problem of a slow mail downloading speed caused by a fact that an existing dual-mode dual-pass terminal cannot effectively utilize a network resource. The method includes obtaining a first transmission rate of a first network connection and a second transmission rate of a second network connection, obtaining a new mail list from a mail server, where the new mail list includes identifiers (IDs) of N mails and a data size of each mail in the N mails, creating a first download task and a second download task according to a preset rule, the first transmission rate, the second transmission rate, and the new mail list such that download time of the N mails is the shortest, downloading a mail indicated by the first download task using the first network connection, and downloading a mail indicated by the second download task using the second network connection.

15 Claims, 4 Drawing Sheets

(51) Int. Cl.
    *H04L 12/58* (2006.01)
    *H04L 29/08* (2006.01)
    *H04W 88/06* (2009.01)
    *H04L 12/54* (2013.01)
    *H04L 29/06* (2006.01)
    *H04W 48/18* (2009.01)

(52) U.S. Cl.
    CPC ........... *H04L 67/322* (2013.01); *H04W 28/16* (2013.01); *H04W 88/06* (2013.01); *H04L 12/5692* (2013.01); *H04L 69/14* (2013.01); *H04W 48/18* (2013.01)

(58) Field of Classification Search
    USPC ......................................................... 709/206
    See application file for complete search history.

(56) References Cited

U.S. PATENT DOCUMENTS

| | | | |
|---|---|---|---|
| 2007/0217349 | A1 | 9/2007 | Fodor et al. |
| 2008/0065734 | A1* | 3/2008 | Yu ............................ H04L 51/24 709/206 |
| 2009/0150498 | A1* | 6/2009 | Branda ................ G06Q 10/107 709/206 |
| 2009/0271611 | A1 | 10/2009 | Roll |
| 2010/0011075 | A1* | 1/2010 | Klassen ................ H04L 51/063 709/206 |
| 2011/0117965 | A1 | 5/2011 | Gong et al. |
| 2014/0274006 | A1 | 9/2014 | Mutya et al. |

FOREIGN PATENT DOCUMENTS

| | | |
|---|---|---|
| CN | 101389092 A | 3/2009 |
| CN | 102065486 A | 5/2011 |
| CN | 102084392 A | 6/2011 |
| CN | 102196591 A | 9/2011 |
| CN | 103024779 A | 4/2013 |
| CN | 103795856 A | 5/2014 |

OTHER PUBLICATIONS

Foreign Communication From a Counterpart Application, PCT Application No. PCT/CN2015/083591, English Translation of Written Opinion dated Oct. 10, 2015, 5 pages.
Foreign Communication From a Counterpart Application, European Application No. 15868579.2, Extended European Search Report dated Oct. 5, 2017, 7 pages.
Machine Translation and Abstract of Chinese Publication No. CN101389092, Mar. 18, 2009, 9 pages.
Machine Translation and Abstract of Chinese Publication No. CN102196591, Sep. 21, 2011, 12 pages.
Machine Translation and Abstract of Chinese Publication No. CN103024779, Apr. 3, 2013, 8 pages.
Machine Translation and Abstract of Chinese Publication No. CN103795856, May 14, 2014, 24 pages.
Foreign Communication From a Counterpart Application, Chinese Application No. 201410749190.7, Chinese Office Action dated Apr. 26, 2018, 6 pages.

* cited by examiner

MAIL OBTAINING METHOD, TERMINAL, AND SYSTEM

CROSS-REFERENCE TO RELATED APPLICATIONS

This application is a continuation of International Patent Application No. PCT/CN2015/083591 filed on Jul. 8, 2015, which claims priority to Chinese Patent Application No. 201410749190.7 filed on Dec. 9, 2014. The disclosures of the aforementioned applications are hereby incorporated by reference in their entireties.

TECHNICAL FIELD

The present disclosure relates to the communications field, and in particular, to a mail obtaining method, a terminal, and a system.

BACKGROUND

A mail client is commonly used office software and plays an important role in a modern electronic office. Generally, mail sending and receiving are implemented by means of cooperative work between a mail server and a terminal on which a mail client is installed. The mail client periodically sends a new-mail obtaining request to the mail server to obtain a mail list of new mails received by the mail server in a period, and then downloads the new mails in the mail list from the mail server.

In recent years, substantial development of intelligent mobile terminals triggers a trend towards directly working on an intelligent mobile terminal. Therefore, sending and receiving mails using an intelligent mobile terminal plays an important role in modern electronic office. Especially, for a dual-mode dual-pass terminal, how to quickly and effectively send and receive mails on the dual-mode dual-pass terminal becomes a problem that needs to be urgently resolved in the industry.

The dual-mode dual-pass terminal refers to a mobile phone that can support network modes in any two network protocols, for example, a terminal that supports network modes in both Code Division Multiple Access (CDMA) and Global System for Mobile Communications (GSM) network protocols, or supports network modes in both Wideband Code Division Multiple Access (WCDMA) and GSM network protocols. This type of terminal can simultaneously keep network connections to networks in the two network modes and automatically hand over between the different network protocols.

A mail client on an existing dual-mode dual-pass terminal can establish a network connection to a mail server using either network protocol, and then download a new mail from the mail server based on the network connection when sending and receiving mails. It can be seen that, when a network transmission rate in the network protocol selected by the mail client is slow, the mail client needs to spend a long time in obtaining the new mail in the mail server. In addition, if a network transmission rate in a network protocol that is not selected by the mail client is fast, but the mail client cannot utilize, in a timely manner, a network resource providing a fast network transmission rate, a great waste of network resources is caused.

SUMMARY

Embodiments of the present disclosure provide a mail obtaining method, a terminal, and a system, which resolve a problem of a slow mail downloading speed caused by a fact that an existing dual-mode dual-pass terminal cannot effectively utilize a network resource, and improve network resource utilization.

To achieve the foregoing objective, the embodiments of the present disclosure use the following technical solutions.

According to a first aspect, an embodiment of the present disclosure provides a mail obtaining method, including obtaining a first transmission rate of a first network connection and a second transmission rate of a second network connection, where the first network connection and the second network connection are network connections established by a terminal to a mail server using different network protocols, obtaining a new mail list from the mail server, where the new mail list includes identifiers (IDs) of N mails and a data size of each mail in the N mails, and N≥1, creating a first download task and a second download task according to a preset rule, the first transmission rate, the second transmission rate, and the new mail list such that download time of the N mails in the new mail list is the shortest, where the first download task includes the IDs of M mails, the second download task includes the IDs of K mails, M≥0, and K≥0, and downloading, using the first network connection, a mail indicated by the first download task, and downloading, using the second network connection, a mail indicated by the second download task in order to download the N mails in the new mail list.

With reference to the first aspect, in a first possible implementation manner of the first aspect, creating a first download task and a second download task according to a preset rule, the first transmission rate, the second transmission rate, and the new mail list includes calculating, according to the first transmission rate, a first download value that can be downloaded using the first network connection in a download period, calculating, according to the second transmission rate, a second download value that can be downloaded using the second network connection in the download period, allocating the IDs of the M mails to the first network connection according to the first download value and the data size of each mail in the N mails, to create the first download task, and allocating the IDs of the K mails to the second network connection according to the second download value and the data size of each mail in the N mails, to create the second download task.

With reference to the first possible implementation manner of the first aspect, in a second possible implementation manner of the first aspect, the data size of each mail in the N mails include a mail header size, a body size, and an attachment size, and allocating the IDs of the M mails to the first network connection according to the first download value and the data size of each mail in the N mails, to create the first download task includes determining actual download data of each mail in the new mail list, where the actual download data includes at least one of the mail header size, the body size, or the attachment size, and allocating the IDs of the M mails to the first network connection according to the actual download data of each mail and the first download value, to create the first download task.

With reference to the second possible implementation manner of the first aspect, in a third possible implementation manner of the first aspect, creating a first download task and a second download task according to a preset rule, the first transmission rate, the second transmission rate, and the new mail list includes splitting data of the $N^{th}$ mail into first data and second data according to the first transmission rate and the second transmission rate if a data size of the $N^{th}$ mail reaches a preset threshold, where the first data includes at least one of the mail header size, the body size, or the attachment size of the $N^{th}$ mail, and the second data includes at least one of the mail header size, the body size, or the attachment size of the $N^{th}$ mail, allocating the first data to the first network connection, to create the first download task, and allocating the second data to the second network connection, to create the second download task.

With reference to any one of the first aspect and the first to third possible implementation manners of the first aspect, in a fourth possible implementation manner of the first aspect, after downloading, using the first network connection, a mail indicated by the first download task, and downloading, using the second network connection, a mail indicated by the second download task, the method further includes combining the M mails downloaded using the first network connection and the K mails downloaded using the second network connection, sorting the downloaded M+K mails according to the IDs, and outputting the L mails if IDs of the first L mails in the sorted M+K mails are consecutive, where $1 \leq L \leq M+K$.

With reference to any one of the first aspect and the first to fourth possible implementation manners of the first aspect, in a fifth possible implementation manner of the first aspect, obtaining a new mail list from the mail server includes downloading the new mail list from the mail server using the first network connection if the first transmission rate is greater than the second transmission rate.

According to a second aspect, an embodiment of the present disclosure provides a terminal, including a transmission rate obtaining unit configured to obtain a first transmission rate of a first network connection and a second transmission rate of a second network connection, where the first network connection and the second network connection are network connections established by the terminal to a mail server using different network protocols, a mail list obtaining unit configured to obtain a new mail list from the mail server, where the new mail list includes IDs of N mails and a data size of each mail in the N mails, and $N \geq 1$, a download task division unit configured to create a first download task and a second download task according to a preset rule, the first transmission rate and the second transmission rate that are obtained by the transmission rate obtaining unit, and the new mail list obtained by the mail list obtaining unit such that download time of the N mails in the new mail list is the shortest, where the first download task includes the IDs of M mails, the second download task includes the IDs of K mails, $M \geq 0$, and $K \geq 0$, and a mail data download unit configured to download, using the first network connection, a mail indicated by the first download task created by the download task division unit, and download, using the second network connection, a mail indicated by the second download task created by the download task division unit in order to download the N mails in the new mail list.

With reference to the second aspect, in a first possible implementation manner of the second aspect, the download task division unit is further configured to calculate, according to the first transmission rate, a first download value that can be downloaded using the first network connection in a download period, calculate, according to the second transmission rate, a second download value that can be downloaded using the second network connection in the download period, allocate the IDs of the M mails to the first network connection according to the first download value and the data size of each mail in the N mails, to create the first download task, and allocate the IDs of the K mails to the second network connection according to the second download value and the data size of each mail in the N mails, to create the second download task.

With reference to the first possible implementation manner of the second aspect, in a second possible implementation manner of the second aspect, the download task division unit is further configured to determine actual download data of each mail in the new mail list, where the actual download data includes at least one of a mail header size, a body size, or an attachment size, and allocate the IDs of the M mails to the first network connection according to the actual download data of each mail and the first download value, to create the first download task, where the data size of each mail in the N mails include the mail header size, the body size, and the attachment size.

With reference to the second possible implementation manner of the second aspect, in a third possible implementation manner of the second aspect, the download task division unit is further configured to split data of the $N^{th}$ mail into first data and second data according to the first transmission rate and the second transmission rate if a data size of the $N^{th}$ mail reaches a preset threshold, where the first data includes at least one of the mail header size, the body size, or the attachment size of the $N^{th}$ mail, and the second data includes at least one of the mail header size, the body size, or the attachment size of the $N^{th}$ mail, allocate the first data to the first network connection, to create the first download task, and allocate the second data to the second network connection, to create the second download task.

With reference to any one of the second aspect and the first to third possible implementation manners of the second aspect, in a fourth possible implementation manner of the second aspect, the terminal further includes a mail combination and output unit configured to combine the M mails downloaded by the mail data download unit using the first network connection and the K mails downloaded by the mail data download unit using the second network connection, sort the downloaded M+K mails according to the IDs, and output the L mails if IDs of the first L mails in the sorted M+K mails are consecutive, where $1 \leq L \leq M+K$.

With reference to any one of the second aspect and the first to fourth possible implementation manners of the second aspect, in a fifth possible implementation manner of the second aspect, the mail list obtaining unit is further configured to download the new mail list from the mail server using the first network connection if the first transmission rate is greater than the second transmission rate.

According to a third aspect, an embodiment of the present disclosure provides a communications system, where the communications system includes the terminal according to any one of the second aspect, or the first to fifth possible implementation manners of the second aspect, and a mail server connected to the terminal, and multiple network connections are established between the terminal and the mail server using different network protocols.

According to the mail obtaining method, the terminal, and the system provided in the embodiments of the present disclosure, a first transmission rate of a first network connection and a second transmission rate of a second network connection are obtained, and a first download task and a second download task are respectively allocated to the first network connection and the second network connection according to a policy, sizes of mails in a new mail list, and the different transmission rates. In this way, when downloading, using the first network connection, a mail indicated by the first download task, the terminal also downloads, in parallel using the second network connection, a mail indicated by the second download task such that network resources are fully scheduled, download time of N mails in the new mail list is the shortest, and finally, download of the N mails in the new mail list is completed. This resolves a problem of a slow mail downloading speed caused by a fact that an existing dual-mode dual-pass terminal cannot effectively utilize a network resource, and improves network resource utilization.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

In the following description, for a purpose of illustration rather than restriction, specific details such as a particular system structure, an interface, and a technology are provided to facilitate a thorough understanding of the present disclosure. However, a person skilled in the art should know that the present disclosure may be also be implemented in another embodiment without these specific details. In other cases, detailed descriptions of well-known apparatuses, circuits, and methods are omitted such that the present disclosure is described without being obscured by unnecessary details.

Embodiment 1

Figure 1:
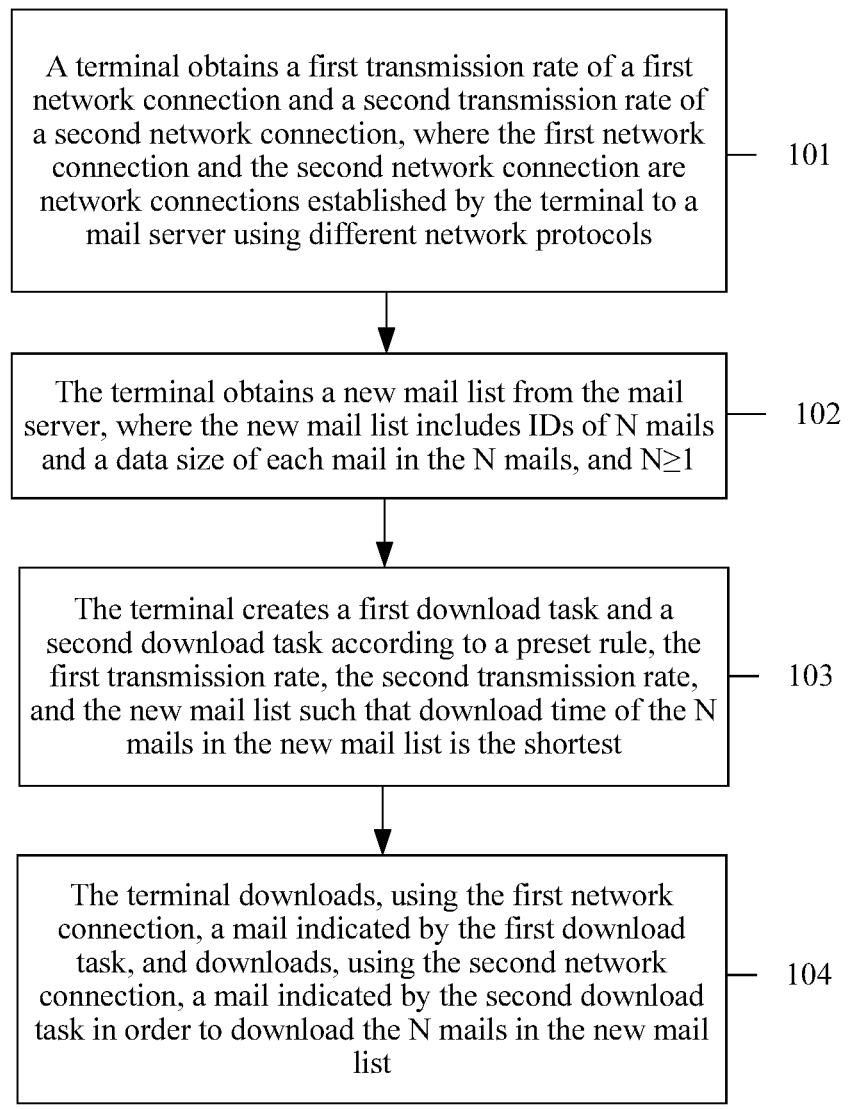
FIG. 1 is a flowchart of a mail obtaining method according to an embodiment of the present disclosure.

This embodiment of the present disclosure provides a mail obtaining method. As shown in FIG. 1, the method includes the following steps.

Step 101: A terminal obtains a first transmission rate of a first network connection and a second transmission rate of a second network connection, where the first network connection and the second network connection are network connections established by the terminal to a mail server using different network protocols.

Step 102: The terminal obtains a new mail list from the mail server, where the new mail list includes IDs of N mails and a data size of each mail in the N mails, and N≥1.

Step 103: The terminal creates a first download task and a second download task according to a preset rule, the first transmission rate, the second transmission rate, and the new mail list such that download time of the N mails in the new mail list is the shortest.

Step 104: The terminal downloads, using the first network connection, a mail indicated by the first download task, and downloads, using the second network connection, a mail indicated by the second download task in order to download the N mails in the new mail list.

In step 101, because a dual-mode dual-pass terminal can simultaneously establish network connections to networks in different protocols, the dual-mode dual-pass terminal may separately test speeds of the network connections on the different network connections, that is, the terminal may obtain the first transmission rate of the first network connection and the second transmission rate of the second network connection, where the first network connection and the second network connection are network connections established by the terminal to the mail server using different network protocols.

There are multiple specific methods used by the terminal to test the speeds of the network connections, and the specific methods are not limited in the present disclosure. For example, the terminal may separately send a very small data packet to the mail server on the first network connection and the second network connection, and separately measure time for sending the data packet by the terminal using the first network connection and the second network connection in order to obtain the first transmission rate of the first network connection and the second transmission rate of the second network connection.

For another example, the terminal may determine a current first transmission rate of the first network connection and a current second transmission rate of the second network connection according to speeds of downloading mails by separately using the first network connection and the second network connection in a previous mail sending and receiving period.

In step 102, after obtaining the first transmission rate of the first network connection and the second transmission rate of the second network connection, the terminal compares the first transmission rate with the second transmission rate, selects a network connection whose network speed is faster, and obtains the new mail list from the mail server using the network connection whose network speed is faster, where the new mail list includes the IDs of the N mails and the data size of each mail in the N mails, and N≥1.

Because a new mail is periodically obtained from the mail server by the terminal on which a mail client is installed, the terminal periodically sends a new-mail obtaining request to the mail server. In this case, the mail server returns, to the terminal according to the new-mail obtaining request sent by the terminal, a new mail list in a new period, that is, a new mail list newly received in a period from a moment at which previous mail download is completed to a moment at which the mail server receives the new-mail obtaining request. The new mail list further includes an identifier ID of each mail in the N mails and a data size of each mail in the N mails. In this way, the terminal can download the new mails from the mail server according to the identifier IDs in the new mail list.

In step 103, after obtaining the new mail list from the mail server, the terminal may create the first download task and the second download task according to the preset rule, the first transmission rate, the second transmission rate, and the new mail list such that the download time of the N mails in the new mail list is the shortest.

The first download task includes the IDs of M mails, and the second download task includes the IDs of K mails, where M≥0, and K≥0. That is, the terminal allocates, to either network connection according to a policy, the first transmission rate and the second transmission rate of the current two network connections, and the data sizes of the mails in the new mail list, a task of downloading a mail of a specific size. In this way, the terminal may simultaneously and quickly download newly received mails for a user using network resources of the two network connections.

Optionally, the terminal may calculate, according to the first transmission rate, a first download value that can be downloaded using the first network connection in a download period, and calculate, according to the second transmission rate, a second download value that can be downloaded using the second network connection in the download period. Then, the terminal allocates the IDs of the M mails to the first network connection according to the first download value and the data size of each mail in the N mails, to create the first download task, and allocates the IDs of the K mails to the second network connection according to the second download value and the data size of each mail in the N mails, to create the second download task. For example, a download period is 30 seconds. The terminal learns, by means of calculation according to the first transmission rate of the first network connection, that a quantity of bytes that can be downloaded using the first network connection in 30 seconds is 1 million, and learns, by means of calculation according to the second transmission rate of the second network connection, that a quantity of bytes that can be downloaded using the second network connection in 30 seconds is 2 million. At present, there are three new mails in the new mail list, and it is assumed that a size of each mail is 1 million bytes. Then, time for downloading one new mail using the first network connection is equal to time for downloading two new mails using the second network connection. In this case, the terminal may allocate the first two new mails to the second network connection and allocate the third new mail to the first network connection according to an order of IDs. In this way, the mails in the new mail list are downloaded at the same time using the first network connection and the second network connection such that the mails in the new mail list may be obtained within shortest time (30 seconds).

Certainly, there may be multiple methods for the terminal to allocate, to either network connection according to a policy, the first transmission rate and the second transmission rate of the current two network connections, and the data sizes of the mails in the new mail list, a task of downloading a mail of a specific size.

For example, when a quantity of mails in the new mail list is less than a specific threshold (for example, only one new mail exists), a network connection whose transmission rate is faster may be directly selected to download the mails, to avoid a waste of network resources caused by enabling multiple network resources. For another example, when a transmission rate of a network connection is less than a threshold, it may be considered that a current network status is poor. Therefore, the network connection may be directly filtered out, and a new mail is downloaded using the other network connection.

In addition, the data size of each mail in the N mails may include a mail header size, a body size, and an attachment size. The terminal may first determine actual download data of each mail in the new mail list when allocating the first download task to the first network connection according to the first download value and the data size of each mail in the N mails, where the actual download data includes at least one of a mail header size, a body size, or an attachment size (for example, for some mails, it is already set in configuration information that there is no need to download an attachment), and then the terminal may allocate the IDs of the M mails to the first network connection according to the actual download data of each mail and the first download value, to create the first download task.

In step 104, the terminal downloads, using the first network connection, the mail indicated by the first download task created in step 103, and downloads, using the second network connection, the mail indicated by the second download task created in step 103, and finally, the terminal may complete downloading the N mails in the new mail list.

Further, the mails may be downloaded in one batch, or may be split and downloaded in multiple download periods when the terminal separately downloads the N mails in the new mail list according to the first download task and the second download task.

The download period of 30 seconds in step 103 is still used as an example. A quantity of bytes that can be downloaded using the first network connection in 30 seconds is 1 million, and a quantity of bytes that can be downloaded using the second network connection in 30 seconds is 2 million. There are six new mails in the new mail list, and it is assumed that a size of each mail is 1 million bytes. Then the terminal may allocate the first four new mails to the second network connection and allocate the latter two new mails to the first network connection according to an order of IDs. In this way, the mails in the new mail list are downloaded at the same time using the first network connection and the second network connection such that the six new mails in the new mail list may be obtained within shortest time (1 minute).

Correspondingly, alternatively, the terminal may allocate the first two new mails to the second network connection and allocate the third new mail to the first network connection according to an order of the IDs. In this way, the terminal may obtain the first three new mails whose IDs are consecutive in the new mail list in a first download period (30 seconds), and the terminal may directly output the three new mails to a display, to present the three new mails to a user such that the user can obtain new mails sooner. In this case, the terminal may continue to allocate the first two new mails to the second network connection and allocate the third new mail to the first network connection according to the order of the IDs in a second download period (30 seconds), and finally complete downloading the six new mails in the new mail list.

According to the mail obtaining method provided in this embodiment of the present disclosure, a first transmission rate of a first network connection and a second transmission rate of a second network connection are obtained, and a first download task and a second download task are respectively allocated to the first network connection and the second network connection according to a policy, sizes of mails in a new mail list, and the different transmission rates. In this way, when downloading, using the first network connection, a mail indicated by the first download task, a terminal also downloads, in parallel using the second network connection, a mail indicated by the second download task such that network resources are fully scheduled, download time of N mails in the new mail list is the shortest, and finally, download of the N mails in the new mail list is completed. This resolves a problem of a slow mail downloading speed caused by a fact that an existing dual-mode dual-pass terminal cannot effectively utilize a network resource, and improves network resource utilization.

Embodiment 2

Figure 2:
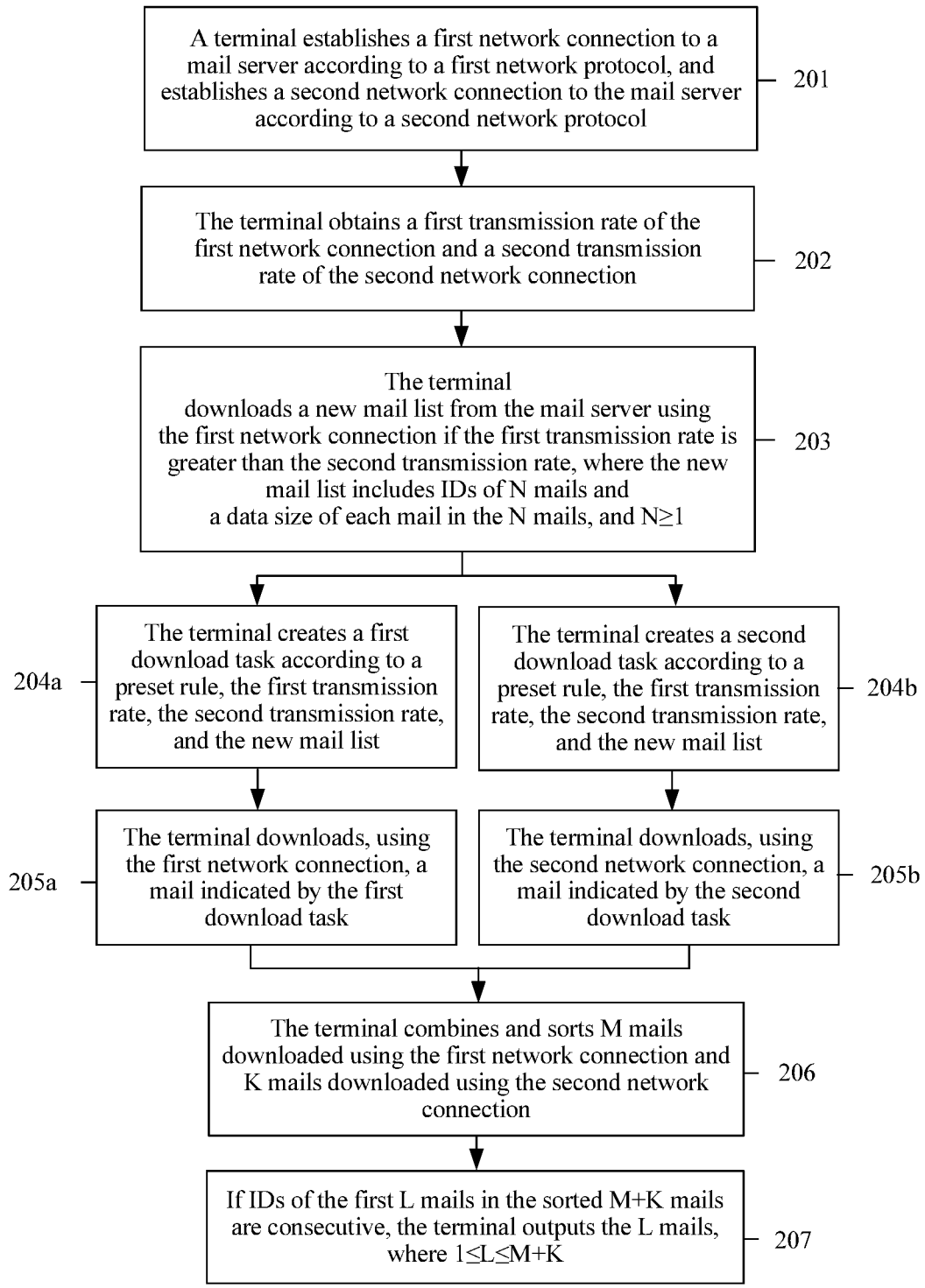
FIG. 2 is another flowchart of a mail obtaining method according to an embodiment of the present disclosure.

This embodiment of the present disclosure provides a mail obtaining method. As shown in FIG. 2, the method includes the following steps.

Step 201: A terminal establishes a first network connection to a mail server according to a first network protocol, and establishes a second network connection to the mail server according to a second network protocol.

Step 202: The terminal obtains a first transmission rate of the first network connection and a second transmission rate of the second network connection.

Step 203: The terminal downloads a new mail list from the mail server using the first network connection if the first transmission rate is greater than the second transmission rate, where the new mail list includes IDs of N mails and a data size of each mail in the N mails, and N≥1.

Step 204a: The terminal creates a first download task according to a preset rule, the first transmission rate, the second transmission rate, and the new mail list, where the download time of the N mails in the new mail list is the shortest.

Step 204b: The terminal creates a second download task according to a preset rule, the first transmission rate, the second transmission rate, and the new mail list, where the download time of the N mails in the new mail list is the shortest.

Step 205a: The terminal downloads, using the first network connection, a mail indicated by the first download task.

Step 205b: The terminal downloads, using the second network connection, a mail indicated by the second download task.

Step 206: The terminal combines and sorts the M mails downloaded using the first network connection and the K mails downloaded using the second network connection.

Step 207: If IDs of the first L mails in the sorted M+K mails are consecutive, the terminal outputs the L mails, where 1≤L≤M+K.

In step 201, a dual-mode dual-pass terminal may simultaneously establish network connections to networks in different network protocols. For example, the dual-mode dual-pass terminal is a terminal that supports network modes in both CDMA and GSM network protocols, or a terminal that supports network modes in both WCDMA and GSM network protocols. This type of terminal can simultaneously keep network connections to networks in the two network modes and automatically hand over between different network protocols. Therefore, the terminal can establish the first network connection to the mail server using the first network protocol and establish the second network connection to the mail server using the second network protocol.

In step 202, after the terminal establishes the first network connection and the second network connection to the mail server, the terminal may separately test speeds of the network connections on the different network connections, that is, the terminal may obtain the first transmission rate of the first network connection and the second transmission rate of the second network connection, where the first network connection and the second network connection are network connections established by the terminal to the mail server using different network protocols.

In step 203, after obtaining the first transmission rate of the first network connection and the second transmission rate of the second network connection, the terminal compares the first transmission rate with the second transmission rate, selects a network connection whose network speed is faster, and obtains the new mail list from the mail server using the network connection whose network speed is faster, where the new mail list includes the IDs of the N mails and the data size of each mail in the N mails, and N≥1.

The data size of each mal in the N mails may include a mail header size, a body size, and an attachment size, and a mail header may include recipient information, sender information, mail subject information, and the like. For some mails, it may be specified in configuration information that there is no need to download all mail data. For example, for some mails, it is already set in configuration information that there is no need to download an attachment. As shown in Table 1, Table 1 is the new mail list that includes the IDs of the N mails and the data size of each mail in the N mails.

TABLE 1

| New mail list | Identifier (ID) | Data size | | |
|---|---|---|---|---|
| | | Mail header size | Body size | Attachment size |
| First mail | | | | |
| Second mail | | | | |
| . . . | | | | |
| $N^{th}$ mail | | | | |

In step 204a and step 204b, after obtaining the new mail list, the terminal creates the first download task and the second download task according to the preset rule, the first transmission rate, the second transmission rate, and the new mail list such that the download time of the N mails in the new mail list is the shortest. That is, step 204a in which the terminal creates the first download task according to the preset rule, the first transmission rate, the second transmission rate, and the new mail list, and in step 204b in which the terminal creates the second download task according to the preset rule, the first transmission rate, the second transmission rate, and the new mail list.

The first download task includes IDs of the M mails, and the second download task includes IDs of the K mails, where M≥0, and K≥0. That is, the terminal allocates, to either network connection according to a policy, the first transmission rate and the second transmission rate of the current two network connections, and the data sizes of the mails in the new mail list, a task of downloading a mail of a specific size. In this way, the terminal may simultaneously and quickly download newly received mails for a user using network resources of the two network connections.

Further, the terminal may first determine actual download data of each mail in the new mail list, where the actual download data includes at least one of a mail header size, a body size, or an attachment size. Then the terminal calculates, according to the first transmission rate, a first download value that can be downloaded using the first network connection in a download period, and calculates, according to the second transmission rate, a second download value that can be downloaded using the second network connection in the download period, and finally, the terminal allocates the IDs of the M mails to the first network connection according to the first download value and the actual download data of each mail in the new mail list, to create the first download task, and allocates the IDs of the K mails to the second network connection according to the second download value and the actual download data of each mail in the new mail list, to create the second download task.

For example, after receiving the new mail list from the mail server, the terminal determines the actual download data of each mail in the new mail list. As shown in Table. 2, for example, a download period is 30 seconds, and a quantity of bytes that can be downloaded using the first network connection in 30 seconds is 1 million, and a quantity of bytes that can be downloaded using the second network connection in 30 seconds is 2 million. In this case, a ratio of the quantity of bytes that can be downloaded using the first network connection in 30 seconds to the quantity of bytes that can be downloaded using the second network connection in 30 seconds is 1:2. The terminal divides tasks according to actual download data of three mails in Table 2, that is, allocates a mail whose identifier ID is 1 to the first network connection, and allocates mails whose IDs are respectively 2 and 3 to the second network connection. In this way, when the terminal downloads the three mails in the new mail list separately according to the first download task and the second download task using the first network connection and the second network connection in the download period of 30 seconds, download time of the three mails in the new mail list is the shortest (30 seconds).

TABLE 2

| | Data size in megabytes (MB) | | | |
|---|---|---|---|---|
| Identifier (ID) | Mail header size | Body size | Attachment size | Actual download data |
| 1 | 0.5 | 0.5 | 0 | 1 |
| 2 | 0.2 | 0.3 | 0.5 (Do not need to download) | 0.5 |
| 3 | 0.5 | 1 | | 1.5 |

In addition, in step 204, when creating the first download task and the second download task according to the preset rule, the terminal may further determine whether the data size of each mail in the new mail list reaches a preset threshold. For example, when the data size of the $N^{th}$ mail is greater than 2 gigabytes (GB), the terminal may split data of the $N^{th}$ mail into first data and second data according to the first transmission rate and the second transmission rate, where the first data may further include at least one of the mail header size, the body size, or the attachment size of the $N^{th}$ mail, and the second data may also further include at least one of the mail header size, the body size, or the attachment size of the $N^{th}$ mail. In this way, the terminal allocates the first data to the first network connection, to create the first download task, and allocates the second data to the second network connection, to create the second download task such that download time of the $N^{th}$ mail is the shortest.

It should be noted that, a method for splitting the data of the $N^{th}$ mail into the first data and the second data in the foregoing step may be performing splitting according to different parts included in the $N^{th}$ mail. For example, the mail header and the body of the $N^{th}$ mail are classified as the first data, and the attachment of the $N^{th}$ mail is classified as the second data. Certainly, alternatively, the $N^{th}$ mail may be split according to a data unit (such as bits). Certainly, alternatively, a part of the $N^{th}$ mail may also be split according to a data size or a quantity. For example, a first attachment and a second attachment in four attachments of the $N^{th}$ mail are classified as the first data, and a third attachment and a fourth attachment in the four attachments of the $N^{th}$ mail are classified as the second data. It can be seen that there are various methods for splitting the data of the $N^{th}$ mail into the first data and the second data, and the present disclosure sets no limitation thereto.

In step 205a and step 205b, the terminal downloads, using the first network connection, the mail indicated by the first download task created in step 204a, and downloads, using the second network connection, the mail indicated by the second download task created in step 204b, and finally, the terminal may complete downloading the N mails in the new mail list. That is, in step 205a in which the terminal downloads, using the first network connection, the mail indicated by the first download task, and in step 205b in which the terminal downloads, using the second network connection, the mail indicated by the second download task.

Further, when the terminal separately downloads the N mails in the new mail list according to the first download task and the second download task, the mails may be downloaded in one batch, or may be split and downloaded in multiple download periods (for specific description, refer to step 104 in Embodiment 1).

In step 206, after the terminal downloads the M mails in the first download task and the K mails in the second download task, a receiving order of the mails downloaded using the two network connections may change because an unknown network speed change may occur in a download process. Therefore, the terminal combines and sorts the M mails downloaded using the first network connection and the K mails downloaded using the second network connection.

Further, the terminal combines the M mails downloaded using the first network connection and the K mails downloaded using the second network connection, and then the terminal sorts the downloaded M+K mails according to magnitude of the identifiers ID, where the sorted M+K mails may sequentially reflect an order of receiving time of the M+K mails.

In step 207, the terminal outputs the L mails, to present the L mails to a user for reading if the IDs of the first L mails in the sorted M+K mails are consecutive, where $1 \leq L \leq M+K$.

Further, because a process of downloading the mails in the new mail list is a continuous process, in order to ensure, to the largest extent, that the user can view a new mail as soon as possible, after combining and sorting the M mails downloaded using the first network connection and the K mails downloaded using the second network connection, the terminal detects whether the IDs of the first L mails in the sorted M+K mails are consecutive. If the IDs of the first L mails in the sorted M+K mails are consecutive, the terminal outputs the L mails to a display, to present the L mails to the user such that the user can obtain the new mail sooner.

According to the mail obtaining method provided in this embodiment of the present disclosure, a first transmission rate of a first network connection and a second transmission rate of a second network connection are obtained, and a first download task and a second download task are respectively allocated to the first network connection and the second network connection according to a policy, sizes of mails in a new mail list, and the different transmission rates. In this way, when downloading, using the first network connection, a mail indicated by the first download task, a terminal also downloads, in parallel using the second network connection, a mail indicated by the second download task such that network resources are fully scheduled, download time of N mails in the new mail list is the shortest, and finally, download of the N mails in the new mail list is completed. This resolves a problem of a slow mail downloading speed caused by a fact that an existing dual-mode dual-pass terminal cannot effectively utilize a network resource, and improves network resource utilization.

Embodiment 3

Figure 3:
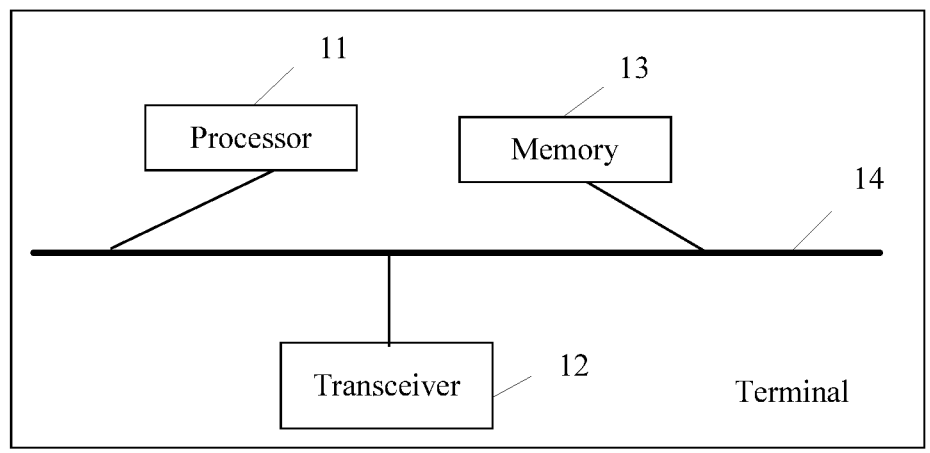
FIG. 3 is a schematic hardware diagram of a terminal according to an embodiment of the present disclosure.

FIG. 3 shows a schematic hardware diagram of a terminal according to the present disclosure.

The terminal herein may be a dual-mode dual-pass terminal, which may be a mobile phone supporting network modes in any two network protocols, for example, a terminal that may support network modes in both CDMA and GSM network protocols or support network modes in both WCDMA and GSM network protocols. The terminal can simultaneously keep network connections to networks in the two network modes and automatically hand over between different network protocols.

In addition, the dual-mode dual-pass terminal may communicate with a mail server on a network side using an Interactive Mail Access Protocol (IMAP) and an Exchange ActiveSync (EAS), which is a mail synchronization protocol of MICROSOFT protocols, periodically send a new-mail obtaining request to the mail server to obtain a mail list of new mails received by the mail server in a period, and download the new mails in the mail list from the mail server.

As shown in FIG. 3, the terminal includes a processor 11, a transceiver 12, a memory 13, and a bus 14.

The processor 11, the transceiver 12, and the memory 13 are connected and communicate with each other using the bus 14.

The processor 11 is a control center of the terminal, where the processor 11 processes data received by the transceiver 12, and invokes data or a program in the memory 13, to execute various functions of the terminal.

The transceiver 12 may be configured to send and receive a signal in a process of sending and receiving information or sending and receiving a mail, and after receiving information sent by a terminal, the transceiver 12 sends the information to the processor 11 for processing. In addition, the transceiver 12 may communicate with another device using a wireless communication network.

The memory 13 may be configured to store a software program or data, and the processor 11 executes various functional applications and data processing of the terminal by running the software program or data stored in the memory 13.

Further, in this embodiment of the present disclosure, the transceiver 12 obtains a first transmission rate of a first network connection and a second transmission rate of a second network connection, and stores the first transmission rate and the second transmission rate in the memory 13, where the first network connection and the second network connection are network connections established by the terminal to a mail server using different network protocols. The transceiver 12 obtains a new mail list from the mail server and stores the new mail list in the memory 13, where the new mail list includes IDs of N mails and a data size of each mal in the N mails, and N≥1. The processor 11 creates a first download task and a second download task according to a preset rule, and the first transmission rate, the second transmission rate, and the new mail list that are in the memory 13 such that download time of the N mails in the new mail list is the shortest, where the first download task includes the IDs of M mails, the second download task includes the IDs of K mails, M≥0, and K≥0. The processor 11 downloads, using the first network connection and using the transceiver 12, a mail indicated by the first download task, and the processor 11 downloads, using the second network connection and using the transceiver 12, a mail indicated by the second download task, until download of the N mails in the new mail list is completed.

Further, that the processor 11 creates a first download task and a second download task according to a preset rule, and the first transmission rate, the second transmission rate, and the new mail list that are in the memory 13 may further include the following steps. The processor 11 calculates, according to the first transmission rate in the memory 13, a first download value that can be downloaded using the first network connection in a download period, and calculates, according to the second transmission rate in the memory 13, a second download value that can be downloaded using the second network connection in the download period. The processor 11 allocates the IDs of the M mails to the first network connection according to the first download value and the data size of each mail in the N mails in the new mail list, to create the first download task, and allocates the IDs of the K mails to the second network connection according to the second download value and the data size of each mail in the N mails in the new mail list, to create the second download task.

Further, the processor 11 allocates the IDs of the M mails to the first network connection according to the first download value and the data size of each mail in the N mails in the new mail list, to create the first download task may further include the following steps. The processor 11 determines actual download data of each mail in the new mail list, where the actual download data includes at least one of a mail header size, a body size, or an attachment size. Then, the processor 11 allocates the IDs of the M mails to the first network connection according to the actual download data of each mail and the first download value, to create the first download task, where the data size of each mail in the N mails include the mail header size, the body size, and the attachment size.

Further, the processor 11 creates a first download task and a second download task according to a preset rule, and the first transmission rate, the second transmission rate, and the new mail list that are in the memory 13 may further include the following steps. If a data size of the $N^{th}$ mail reaches a preset threshold, the processor 11 splits data of the $N^{th}$ mail into first data and second data according to the first transmission rate and the second transmission rate, where the first data includes at least one of the mail header size, the body size, or the attachment size of the $N^{th}$ mail, and the second data includes at least one of the mail header size, the body size, or the attachment size of the $N^{th}$ mail. The processor 11 allocates the first data to the first network connection, to create the first download task, and allocates the second data to the second network connection, to create the second download task.

Further, after the processor 11 downloads, using the first network connection and using the transceiver 12, the mail indicated by the first download task, and the processor 11 downloads, using the second network connection and using the transceiver 12, the mail indicated by the second download task, the following steps may be further included. The processor 11 combines the M mails downloaded using the first network connection and the K mails downloaded using the second network connection. The processor 11 sorts the downloaded M+K mails according to the IDs. The processor 11 outputs the L mails using the transceiver 12, to present the L mails to a user if IDs of the first L mails in the sorted M+K mails are consecutive, where 1≤L≤M+K.

Further, the transceiver 12 obtains a new mail list from the mail server and stores the new mail list in the memory 13 may further include the following step. The processor 11 downloads the new mail list from the mail server using the first network connection and using the transceiver 12 if the first transmission rate is greater than the second transmission rate.

According to the terminal provided in this embodiment of the present disclosure, a first transmission rate of a first network connection and a second transmission rate of a second network connection are obtained, and a first download task and a second download task are respectively allocated to the first network connection and the second network connection according to a policy, sizes of mails in a new mail list, and the different transmission rates. In this way, when downloading, using the first network connection, a mail indicated by the first download task, the terminal also downloads, in parallel using the second network connection, a mail indicated by the second download task such that network resources are fully scheduled, download time of N mails in the new mail list is the shortest, and finally, download of the N mails in the new mail list is completed. This resolves a problem of a slow mail downloading speed caused by a fact that an existing dual-mode dual-pass terminal cannot effectively utilize a network resource, and improves network resource utilization.

Embodiment 4

Figure 4:
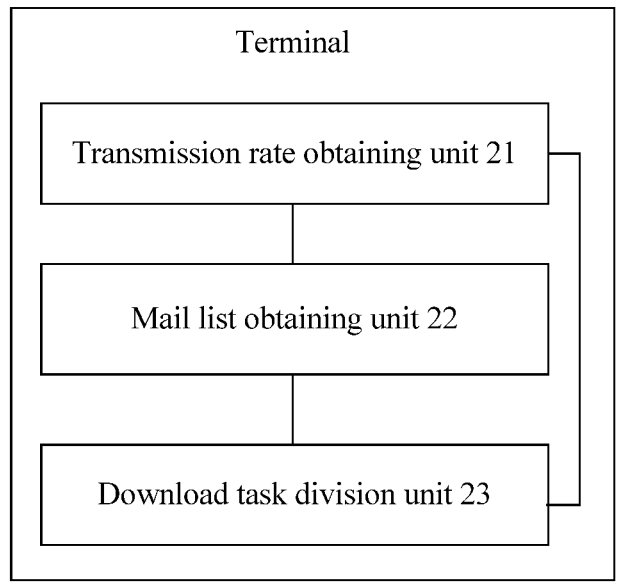
FIG. 4 is a schematic structural diagram of a terminal according to an embodiment of the present disclosure.

This embodiment of the present disclosure provides a terminal. As shown in FIG. 4, the terminal includes a transmission rate obtaining unit 21 configured to obtain a first transmission rate of a first network connection and a second transmission rate of a second network connection, where the first network connection and the second network connection are network connections established by the terminal to a mail server using different network protocols, a mail list obtaining unit 22 configured to obtain a new mail list from the mail server, where the new mail list includes IDs of N mails and a data size of each mail in the N mails, and N≥1, a download task division unit 23 configured to create a first download task and a second download task according to a preset rule, the first transmission rate and the second transmission rate that are obtained by the transmission rate obtaining unit 21, and the new mail list obtained by the mail list obtaining unit 22 such that download time of the N mails in the new mail list is the shortest, where the first download task includes the IDs of M mails, the second download task includes the IDs of K mails, M≥0, and K≥0, and a mail data download unit (not shown) configured to download, using the first network connection, a mail indicated by the first download task created by the download task division unit 23, and download, using the second network connection, a mail indicated by the second download task created by the download task division unit 23 in order to obtain the N mails in the new mail list.

The download task division unit 23 is further configured to calculate, according to the first transmission rate, a first download value that can be downloaded using the first network connection in a download period, calculate, according to the second transmission rate, a second download value that can be downloaded using the second network connection in the download period, allocate the IDs of the M mails to the first network connection according to the first download value and the data size of each mail in the N mails in the new mail list, to create the first download task, and allocate the IDs of the K mails to the second network connection according to the second download value and the data size of each mail in the N mails in the new mail list, to create the second download task.

The download task division unit 23 is further configured to determine actual download data of each mail in the new mail list, where the actual download data includes at least one of a mail header size, a body size, or an attachment size, and allocate the IDs of the M mails to the first network connection according to the actual download data of each mail and the first download value, to create the first download task, where the data size of each mail in the N mails include the mail header size, the body size, and the attachment size.

The download task division unit 23 is further configured to split data of the $N^{th}$ mail into first data and second data according to the first transmission rate and the second transmission rate if a data size of the $N^{th}$ mail reaches a preset threshold, where the first data includes at least one of the mail header size, the body size, or the attachment size of the $N^{th}$ mail, and the second data includes at least one of the mail header size, the body size, or the attachment size of the $N^{th}$ mail, allocate the first data to the first network connection, to create the first download task, and allocate the second data to the second network connection, to create the second download task.

Figure 5:
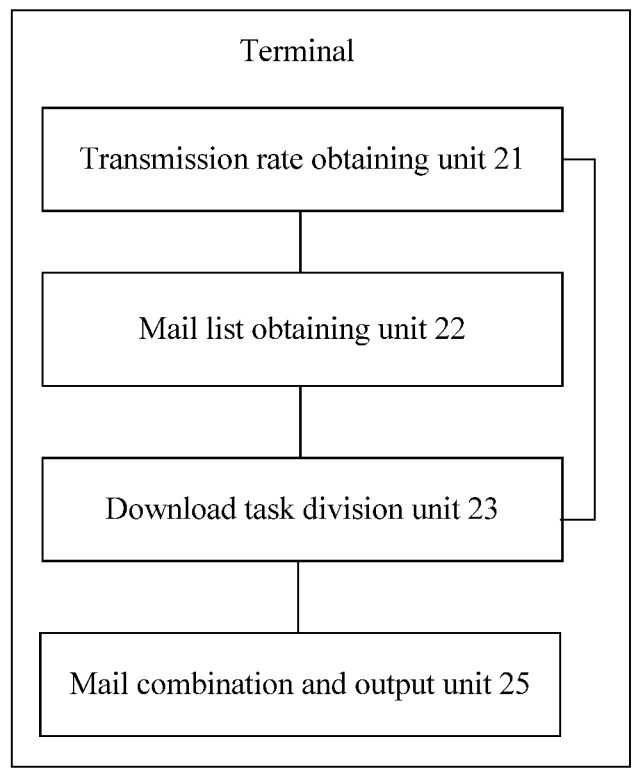
FIG. 5 is another schematic structural diagram of a terminal according to an embodiment of the present disclosure.

As shown in FIG. 5, the terminal further includes a mail combination and output unit 25 configured to combine the M mails downloaded by the mail data download unit using the first network connection and the K mails downloaded by the mail data download unit using the second network connection, sort the downloaded M+K mails according to the IDs, and output the L mails if IDs of the first L mails in the sorted M+K mails are consecutive, where 1≤L≤M+K.

The mail list obtaining unit 22 is further configured to download the new mail list from the mail server using the first network connection if the first transmission rate obtained by the transmission rate obtaining unit 21 is greater than the second transmission rate obtained by the transmission rate obtaining unit 21.

According to the terminal provided in this embodiment of the present disclosure, a first transmission rate of a first network connection and a second transmission rate of a second network connection are obtained, and a first download task and a second download task are respectively allocated to the first network connection and the second network connection according to a policy, sizes of mails in a new mail list, and the different transmission rates. In this way, when downloading, using the first network connection, a mail indicated by the first download task, the terminal also downloads, in parallel using the second network connection, a mail indicated by the second download task such that network resources are fully scheduled, download time of N mails in the new mail list is the shortest, and finally, download of the N mails in the new mail list is completed. This resolves a problem of a slow mail downloading speed caused by a fact that an existing dual-mode dual-pass terminal cannot effectively utilize a network resource, and improves network resource utilization.

Embodiment 5

Figure 6:
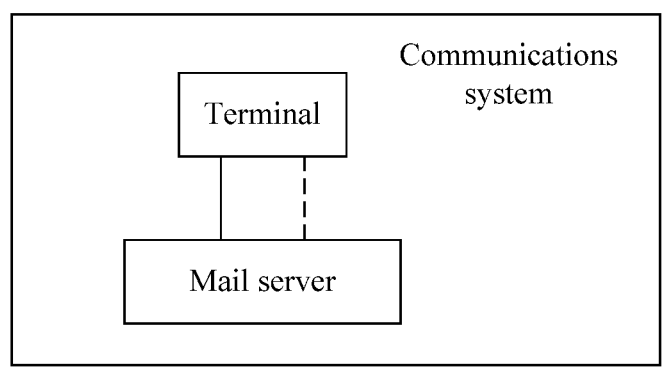
FIG. 6 is a schematic architectural diagram of a communications system according to an embodiment of the present disclosure.

This embodiment of the present disclosure provides a communications system. As shown in FIG. 6, the communications system includes the terminal according to Embodiment 3 or Embodiment 4, and a mail server connected to the terminal.

Multiple network connections are established between the terminal and the mail server using different network protocols. As shown in FIG. 6, this embodiment of the present disclosure presents two network connections (respectively indicated by a solid line and a dashed line in the FIG. 6) between the terminal and the mail server as an example.

Further, for a method for obtaining a mail using the terminal and the mail server, reference may be made to Embodiment 1 and Embodiment 2, and details are not described herein again.

According to the communications system provided in this embodiment of the present disclosure, a first transmission rate of a first network connection and a second transmission rate of a second network connection are obtained, and a first download task and a second download task are respectively allocated to the first network connection and the second network connection according to a policy, sizes of mails in a new mail list, and the different transmission rates. In this way, when downloading, using the first network connection, a mail indicated by the first download task, a terminal also downloads, in parallel using the second network connection, a mail indicated by the second download task such that network resources are fully scheduled, download time of N mails in the new mail list is the shortest, and finally, download of the N mails in the new mail list is completed. This resolves a problem of a slow mail downloading speed caused by a fact that an existing dual-mode dual-pass terminal cannot effectively utilize a network resource, and improves network resource utilization.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be allocated on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The integrated unit may be stored in a computer-readable storage medium when the integrated unit is implemented in the form of a software functional unit and sold or used as an independent product. Based on such an understanding, the technical solutions of the present disclosure essentially, or the part, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A mail obtaining method, comprising:
    obtaining a first transmission rate of a first network connection and a second transmission rate of a second network connection, wherein the first network connection and the second network connection are network connections established by a terminal to a mail server using different network protocols;
    obtaining a new mail list from the mail server, wherein the new mail list comprises identifiers (IDs) of N mails and a data size of each mail in the N mails, and wherein $N \geq 1$;
    creating a first download task and a second download task according to a preset rule, the first transmission rate, the second transmission rate, and the new mail list such that download time of the N mails in the new mail list is the shortest, wherein the first download task comprises IDs of M mails, wherein the second download task comprises IDs of K mails, wherein $M \geq 0$, and wherein $K \geq 0$;
    downloading, using the first network connection, a mail indicated by the first download task;
    downloading, using the second network connection, a mail indicated by the second download task at the same time as downloading the mail indicated by the first download task;
    combining the M mails downloaded using the first network connection and the K mails downloaded using the second network connection;
    sorting the downloaded M+K mails according to the IDs; and
    outputting L mails when IDs of first L mails in the sorted M+K mails are consecutive, wherein $1 \leq L \leq M+K$.

2. The method according to claim 1, wherein creating the first download task and the second download task comprises:
    calculating, according to the first transmission rate, a first download value that can be downloaded using the first network connection in a download period;
    calculating, according to the second transmission rate, a second download value that can be downloaded using the second network connection in the download period;
    allocating the IDs of the M mails to the first network connection according to the first download value and the data size of each mail in the N mails in the new mail list, to create the first download task; and
    allocating the IDs of the K mails to the second network connection according to the second download value and the data size of each mail in the N mails in the new mail list, to create the second download task.

3. The method according to claim 2, wherein the data size of each mail in the N mails comprise a mail header size, a body size, and an attachment size, and wherein allocating the IDs of the M mails to the first network connection comprises:
- determining actual download data of each mail in the new mail list, wherein the actual download data comprises at least one of the mail header size, the body size, and the attachment size; and
- allocating the IDs of the M mails to the first network connection according to the actual download data of each mail and the first download value, to create the first download task.

4. The method according to claim 3, wherein creating the first download task and the second download task comprises:
- splitting data of an $n^{th}$ mail into first data and second data according to the first transmission rate and the second transmission rate when a data size of the $n^{th}$ mail reaches a preset threshold, wherein the first data comprises at least one of a mail header size, a body size, and an attachment size of the $n^{th}$ mail, wherein the second data comprises at least one of the mail header size, the body size, and the attachment size of the $n^{th}$ mail, and wherein $1 \geq n \geq N$;
- allocating the first data to the first network connection, to create the first download task; and
- allocating the second data to the second network connection, to create the second download task.

5. The method according to claim 1, wherein obtaining the new mail list from the mail server comprises downloading the new mail list from the mail server using the first network connection when the first transmission rate is greater than the second transmission rate.

6. A terminal, comprising:
- a memory comprising instructions; and
- a processor coupled to the memory, wherein the instructions cause the processor to be configured to:
  - obtain a first transmission rate of a first network connection and a second transmission rate of a second network connection, wherein the first network connection and the second network connection are network connections established by the terminal to a mail server using different network protocols;
  - obtain a new mail list from the mail server, wherein the new mail list comprises identifiers (IDs) of N mails and a data size of each mail in the N mails, and wherein $N \geq 1$;
  - create a first download task and a second download task according to a preset rule, the first transmission rate and the second transmission rate, and the new mail list such that download time of the N mails in the new mail list is the shortest, wherein the first download task comprises IDs of M mails, wherein the second download task comprises IDs of K mails, wherein $M \geq 0$, and wherein $K \geq 0$;
  - download, using the first network connection, a mail indicated by the first download task;
  - download, using the second network connection, a mail indicated by the second download task at the same time as downloading the mail indicated by the first download task;
  - combine the M mails downloaded using the first network connection and the K mails downloaded using the second network connection;
  - sort the downloaded M+K mails according to the IDs; and
  - output L mails when IDs of first L mails in the sorted M+K mails are consecutive, wherein $1 \leq L \leq M+K$.

7. The terminal according to claim 6, wherein the instructions further cause the processor to be configured to:
- calculate, according to the first transmission rate, a first download value that can be downloaded using the first network connection in a download period;
- calculate, according to the second transmission rate, a second download value that can be downloaded using the second network connection in the download period;
- allocate the IDs of the M mails to the first network connection according to the first download value and the data size of each mail in the N mails, to create the first download task; and
- allocate the IDs of the K mails to the second network connection according to the second download value and the data size of each mail in the N mails, to create the second download task.

8. The terminal according to claim 7, wherein the instructions further cause the processor to be configured to:
- determine actual download data of each mail in the new mail list, wherein the actual download data comprises at least one of a mail header size, a body size, and an attachment size; and
- allocate the IDs of the M mails to the first network connection according to the actual download data of each mail and the first download value, to create the first download task, wherein the data size of each mail in the N mails comprise the mail header size, the body size, and the attachment size.

9. The terminal according to claim 8, wherein the instructions further cause the processor to be is further configured to:
- split data of an $n^{th}$ mail into first data and second data according to the first transmission rate and the second transmission rate when a data size of the $n^{th}$ mail reaches a preset threshold, wherein the first data comprises at least one of a mail header size, a body size, and an attachment size of the $n^{th}$ mail, and wherein the second data comprises at least one of the mail header size, the body size, and the attachment size of the $n^{th}$ mail;
- allocate the first data to the first network connection, to create the first download task; and
- allocate the second data to the second network connection, to create the second download task.

10. The terminal according to claim 6, wherein instructions further cause the processor to be configured to download the new mail list from the mail server using the first network connection when the first transmission rate is greater than the second transmission rate.

11. A communications system, comprising:
- a terminal; and
- a mail server coupled to the terminal,
- wherein the terminal comprises a processor configured to:
  - obtain a first transmission rate of a first network connection and a second transmission rate of a second network connection, wherein the first network connection and the second network connection are network connections established by the terminal to the mail server using different network protocols;
  - obtain a new mail list from the mail server, wherein the new mail list comprises identifiers (IDs) of N mails and a data size of each mail in the N mails, and wherein $N \geq 1$;
  - create a first download task and a second download task according to a preset rule, the first transmission rate, the second transmission rate, and the new mail list such that download time of the N mails in the new mail list is the shortest, wherein the first download task comprises IDs of M mails, wherein the second download task comprises IDs of K mails, wherein $M \geq 0$, and wherein $K \geq 0$;

download, using the first network connection, a mail indicated by the first download task;

download, using the second network connection, a mail indicated by the second download task at the same time as downloading the mail indicated by the first download task;

combine the M mails downloaded using the first network connection and the K mails downloaded using the second network connection;

sort the downloaded M+K mails according to the IDs; and output L mails when IDs of first L mails in the sorted M+K mails are consecutive, wherein $1 \leq L \leq M+K$.

12. The communications system according to claim 11, wherein the processor is further configure to:

calculate, according to the first transmission rate, a first download value that can be downloaded using the first network connection in a download period;

calculate, according to the second transmission rate, a second download value that can be downloaded using the second network connection in the download period;

allocate the IDs of the M mails to the first network connection according to the first download value and the data size of each mail in the N mails, to create the first download task; and allocate the IDs of the K mails to the second network connection according to the second download value and the data size of each mail in the N mails, to create the second download task.

13. The communications system according to claim 12, wherein the processor is further configure to:

determine actual download data of each mail in the new mail list, wherein the actual download data comprises at least one of a mail header size, a body size, and an attachment size; and allocate the IDs of the M mails to the first network connection according to the actual download data of each mail and the first download value, to create the first download task, wherein the data size of each mail in the N mails comprise the mail header size, the body size, and the attachment size.

14. The communications system according to claim 13, wherein the processor is further configure to:

split data of an $n^{th}$ mail into first data and second data according to the first transmission rate and the second transmission rate when a data size of the $n^{th}$ mail reaches a preset threshold, wherein the first data comprises at least one of a mail header size, a body size, and an attachment size of the $n^{th}$ mail, and wherein the second data comprises at least one of the mail header size, the body size, and the attachment size of the $n^{th}$ mail;

allocate the first data to the first network connection, to create the first download task; and allocate the second data to the second network connection, to create the second download task.

15. The communications system according to claim 11, wherein the processor is further configure to download the new mail list from the mail server using the first network connection when the first transmission rate is greater than the second transmission rate.

* * * * *